US011023327B2

United States Patent
Linnen et al.

(10) Patent No.: US 11,023,327 B2
(45) Date of Patent: Jun. 1, 2021

(54) ENCRYPTION DETECTION AND BACKUP MANAGEMENT

(71) Applicant: Western Digital Technologies, Inc., San Jose, CA (US)

(72) Inventors: Daniel Joseph Linnen, Naperville, IL (US); Ashish Ghai, San Jose, CA (US); Avinash Rajagiri, San Jose, CA (US); Srikar Peesari, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 70 days.

(21) Appl. No.: 15/926,685

(22) Filed: Mar. 20, 2018

(65) Prior Publication Data
US 2019/0294507 A1     Sep. 26, 2019

(51) Int. Cl.
| | | |
|---|---|---|
| *G06F 11/14* | (2006.01) | |
| *G06F 17/18* | (2006.01) | |
| *H04L 29/08* | (2006.01) | |

(52) U.S. Cl.
CPC ...... *G06F 11/1451* (2013.01); *G06F 11/1464* (2013.01); *G06F 11/1469* (2013.01); *G06F 17/18* (2013.01); *H04L 67/1097* (2013.01)

(58) Field of Classification Search
CPC .......... G06F 21/00; G06F 21/56; G06F 21/60; G06F 11/14; G06F 21/602
USPC .......................................................... 726/23
See application file for complete search history.

(56) References Cited

U.S. PATENT DOCUMENTS

| | | | | |
|---|---|---|---|---|
| 8,069,484 | B2 * | 11/2011 | McMillan .............. | G06F 21/563 726/23 |
| 9,336,381 | B1 * | 5/2016 | Kane-Parry ........... | G06F 21/577 |
| 2007/0240217 | A1 * | 10/2007 | Tuvell .................... | G06F 21/565 726/24 |
| 2013/0067579 | A1 * | 3/2013 | Beveridge ............. | G06F 21/563 726/24 |
| 2015/0058987 | A1 * | 2/2015 | Thure .................... | G06F 21/565 726/23 |
| 2017/0140156 | A1 * | 5/2017 | Gu ......................... | G06F 21/566 |
| 2019/0130097 | A1 | 5/2019 | Berler et al. | |

FOREIGN PATENT DOCUMENTS

EP           3038003 A1 *    6/2016          G06F 21/563

OTHER PUBLICATIONS

Devore, Jay. Probability and Statistics for Engineering and the Sciences. Brooks/Cole Publishing Co., Pacific Grove, CA. (Fourth Edition, 1995), pp. 13-16, 172, 219-220 (Year: 1995).*
Devore, Jay. Probability and Statistics for Engineering and the Sciences. Brooks/Cole Publishing Co., Pacific Grove, CA. (Fourth Edition, 1995), pp. 13-16, 172, 219-220 (Year: 1995).*
(Continued)

*Primary Examiner* — William E. Baughman
*Assistant Examiner* — John Francis Wojton
(74) *Attorney, Agent, or Firm* — Barry IP Law, P.C.

(57) ABSTRACT

A first entropy indicator is calculated at a first time for a collection of data stored in at least one memory. A second entropy indicator is calculated at a second time for the collection of data. The first entropy indicator is compared with the second entropy indicator. Based on the comparison, it is determined whether to back up the collection of data and/or whether to retain an earlier backup of the collection of data.

35 Claims, 10 Drawing Sheets

(56) References Cited

OTHER PUBLICATIONS

Lyda, Robert et al: "Using Entropy Analysis to Find Encrypted and Packed Malware", Security & Privacy, IEEE, IEEE Service Center, Los Alamos, CA, US, vol. 5, No. 2 Mar. 1, 2007 (Mar. 1, 2007), pp. 40-45 (Year: 2007).*

* cited by examiner

ENCRYPTION DETECTION AND BACKUP MANAGEMENT

BACKGROUND

Ransomware typically involves blocking access to files by encrypting a user's files and holding the keys to decrypt the files ransom until money is paid. In some cases, the user may have a backup of the files, but ransomware or other types of computer viruses may encrypt files over time to avoid detection. The user may lose access to their files if they do not have an earlier backup of the unencrypted files. However, even if the user has a backup of the files, one or more encrypted files may have been inadvertently backed up, thereby overwriting an earlier backup of the unencrypted file. The failure to detect unauthorized encryption early on can lead to losing data that has not been safely backed up.

Some recent ransomware detection schemes include comparing changes made to special "tripwire files" to detect unauthorized changes made to these files. However, there are several problems in using tripwire files to detect unauthorized encryption. As noted above, the encryption may be performed over a relatively long period of time so that many files can be encrypted before the encryption of a tripwire file is detected. Sophisticated ransomware may also identify and avoid encrypting the special tripwire files due to certain characteristics of the tripwire file, such as the size or content of the file. In addition, the detection of an encrypted tripwire file usually prevents the backing up or copying of all files in conventional systems to avoid overwriting earlier backups of the unencrypted files with new backups of the encrypted versions of the files. Accordingly, better detection of unauthorized encryption is needed to allow for corrective measures to be taken early on to protect files.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
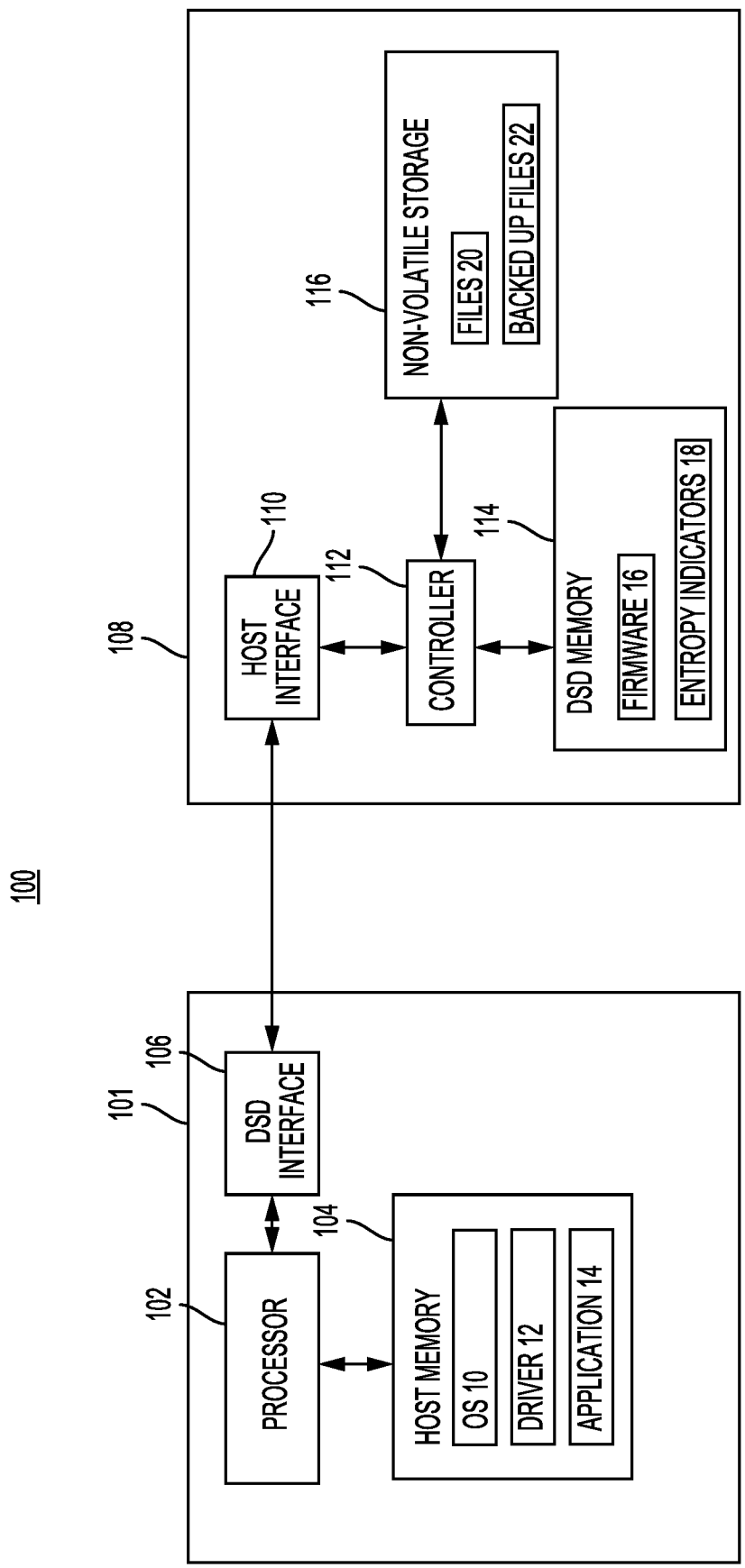
FIG. 1 is a block diagram of a computer system including a host and a Data Storage Device (DSD) according to an embodiment.

FIG. 1 is a block diagram of system 100 including host 101 and Data Storage Device (DSD) 108 according to an embodiment. System 100 can include, for example, a desktop, laptop or notebook computer or another type of electronic device such as a tablet, smartphone, network media player, Network Attached Storage (NAS) device, portable media player, or Digital Video Recorder (DVR). In other implementations, host 101 and DSD 108 may not be physically co-located, such as where host 101 and DSD 108 communicate via a network as in a cloud storage system or other remote storage system, as in the example of FIG. 8. In this regard, host 101 may include, for example, a remote or local storage server.

In the example of FIG. 1, host 101 includes processor 102, host memory 104, and DSD interface 106. Processor 102 can include circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 102 can include a System on a Chip (SoC).

Host memory 104 can represent a volatile or Non-Volatile Memory (NVM) of host 101 that interfaces with processor 102 to provide information stored in host memory 104 to processor 102 during execution of instructions in software programs, such as Operating System (OS) 10, driver 12, and application 14. More specifically, processor 102 first loads computer-executable instructions received from DSD 108 into a region of host memory 104. Processor 102 can then execute the stored process instructions from host memory 104. Data to be stored in or retrieved from DSD 108 can also be stored in host memory 104 so that the data can be accessed by processor 102 during execution of software programs to the extent that such software programs have a need to access and/or modify the data.

Host memory 104 can include, for example, a Random-Access Memory (RAM), such as a Dynamic RAM (DRAM). In other implementations, host memory 104 can include other types of solid-state memory, such for example, a Magnetoresistive RAM (MRAM). While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory, or any combination thereof), NOR memory, EEPROM, Ferroelectric Memory (FeRAM), MRAM, other discrete NVM chips, or any combination thereof.

OS 10 manages hardware and software resources of system 100, and can include, for example, a Linux OS, Android OS, Windows OS, Mac OS, or a customized OS. Hardware resources managed by OS 10 can include, for example, host memory 104, processor 102, DSD interface 106, and DSD 108. Software resources managed by OS 10 can include, for example, one or more file systems (not shown), driver 12, other device drivers (not shown), application 14, and other user space applications.

Driver 12 provides a software interface for interacting with DSD 108 on host 101. In some implementations, OS 10, application 14, or other user-space applications can generate read or write requests for DSD 108, and request performance of the read or write requests via driver 12.

Application 14 can include computer-executable instructions for performing the encryption detection processes described below. In some implementations, application 14 may include virus detection software or software for backing up collections of data stored in DSD 108, such as files, data objects, or contiguous ranges of blocks. As discussed in more detail below, the encryption detection processes described below may alternatively or additionally be performed by firmware 16 executed on DSD 108.

DSD interface 106 allows processor 102 to communicate with DSD 108, and may communicate according to a standard, such as, for example, Serial Advanced Technology Attachment (SATA), PCI express (PCIe), Small Computer System Interface (SCSI), Serial Attached SCSI (SAS), Ethernet, or WiFi. In this regard, host 101 and DSD 108 may communicate via a bus or may communicate over a network such as a Local Area Network (LAN) or a Wide Area Network (WAN), such as the internet. As will be appreciated by those of ordinary skill in the art, one or both of DSD interface 106 and host memory 104 can be included with processor 102 in some implementations as a single component, such as an SoC.

As shown in FIG. 1, DSD 108 includes host interface 110, controller 112, DSD memory 114, and non-volatile storage 116. In some implementations, DSD 108 can include, for example, a Hard Disk Drive (HDD), a Solid State Drive (SSD), a tape drive, or a hybrid drive that includes different types of storage media for non-volatile storage 116, such as a Solid State Hybrid Drive (SSHD) that includes both magnetic disk storage media and solid state storage media. In some implementations, DSD 108 can include a storage array such that non-volatile storage 116 includes a plurality of storage devices such as HDDs and/or SSDs.

In addition, DSD 108 can include a NAS device where collections of data are accessed via a network as files, a Storage Area Network (SAN) device where collections of data are accessed via a network as contiguous ranges of blocks (e.g., blocks stored on a disk surface of an HDD or in a die of an SSD, or portions thereof), or a Direct Attached Storage (DAS) device that is locally attached to host 101. In this regard, host interface 110 allows DSD 108 to communicate with host 101, using a bus or network standard, such as, for example, SATA, PCIe, SCSI, SAS, Ethernet, or WiFi. In some implementations, DSD 108 may form part of a networked cluster of storage devices for object-orientated access of data.

Controller 112 can include one or more processors for executing instructions for controlling operation of DSD 108. Controller 112 can include circuitry, such as, for example, a microcontroller, a DSP, an ASIC, a FPGA, hard-wired logic, analog circuitry and/or a combination thereof. In some implementations, controller 112 can include an SoC or may form an SoC with host interface 110.

DSD memory 114 can represent a volatile or non-volatile memory of DSD 108 that interfaces with controller 112 to provide information stored in DSD memory 114 to controller 112 during execution of instructions in software programs such as firmware 16. DSD memory 114 can include a memory that can be quickly accessed by controller 112, such as a DRAM. In other implementations, DSD memory 114 can include other types of solid-state memory, such as those described above with respect to host memory 104. As shown in FIG. 1, DSD memory 114 can store firmware 16 and entropy indicators 18.

Firmware 16 can include computer-executable instructions that are loaded from non-volatile storage 116 for execution by controller 112 in controlling operation of DSD 108. In other implementations, firmware 16 may instead be loaded from a dedicated NVM of DSD 108 for storing firmware 16. In some implementations, portions of firmware 16 may be loaded into DSD memory 114 by controller 112 in performing the encryption detection processes described below.

In the example of FIG. 1, DSD memory 114 stores entropy indicators 18 that indicate a level of entropy of collections of data (e.g., files, objects, or contiguous ranges of blocks) stored in non-volatile storage 116, such as for files 20. In some implementations, entropy indicators 18 can include a data structure associating a numerical value representing an entropy level with a corresponding identifier, such as a file name, object name, or a storage location. As discussed in more detail below, entropy indicators 18 can be calculated by controller 112 or processor 102 using at least one of a Shannon entropy, a chi-squared distribution, a histogram of values, and a Monte Carlo Pi approximation. In some implementations, entropy indicators 18 can be non-volatilely stored in non-volatile storage 116 or in another non-volatile memory of DSD 108 and loaded into DSD memory 114 as needed to detect encryption of files 20.

Non-volatile storage 116 includes non-volatile memory, such as rotating magnetic disks, a solid-state memory, or a combination of different types of memory, as in the case where DSD 108 is an SSHD. As shown in FIG. 1, non-volatile storage 116 stores files 20 and backed up files 22. Files 20 can include user files accessed by host 101. Backed up files 22 can include backed up copies of all or some of files 20, which may be compressed. In other implementations, backed up files 20 may be stored in a different non-volatile storage outside of DSD 108, such as in a cloud-based server or other DSD external to DSD 108. As discussed in more detail below, application 14 and/or firmware 16 can use entropy indicators 18 to detect encryption of files 20, which can help determine whether to back up certain files 20 and/or whether to retain an earlier backup included in backed up files 22.

Encryption Detection Examples

Figure 2A:
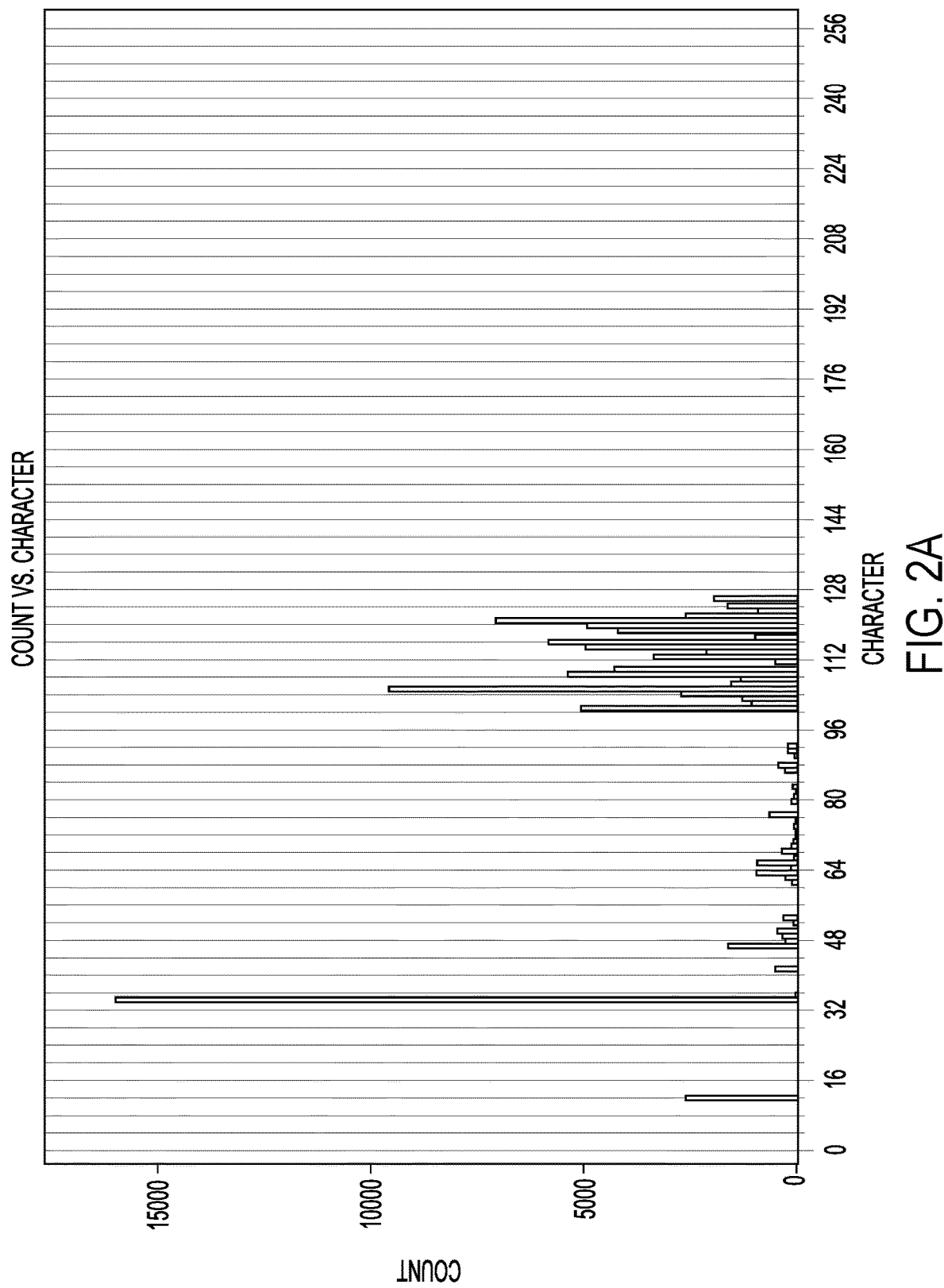
FIG. 2A is an example histogram depicting a character count of a collection of data according to an embodiment.

FIG. 2A is an example histogram depicting a character count of a collection of data, such as a file, according to an embodiment. As shown in FIG. 2A, an unencrypted and uncompressed collection of data typically has certain character or symbol values repeated with much higher frequency than other character values. In the example of FIG. 2A, certain characters represented by the 256 values formed by 8 bit words are used repeatedly within the collection of data, while other characters are not used at all, or used very little.

The level of entropy for the unencrypted and uncompressed collection of data in FIG. 2A is relatively low when compared to encrypted or compressed collections of data. In contrast to an encrypted or compressed collection of data where the use of different characters is more randomly or evenly distributed, certain characters in the unencrypted and uncompressed collection of data in FIG. 2A are more likely to be used than other characters in the collection of data.

In some implementations, an entropy indicator for the collection of data may include, for example, the number of different characters used in the collection of data or the number of characters that exceed an average count for all the characters in the collection of data. For example, if an average count for all the characters in FIG. 2A is ten instances, an entropy indicator for the file in FIG. 2A can be the number of characters that have been used in the collection of data more than ten times. As discussed in more detail below, other implementations may calculate entropy indicators differently, such as by using a Shannon entropy indicator. In addition, the data used to calculate the entropy indicator may be a subset of the data in the collection of data or may be all the data in the collection of data. With reference to the example of FIG. 1, the entropy indicators for files 20 can be stored as part of entropy indicators 18.

Figure 2B:
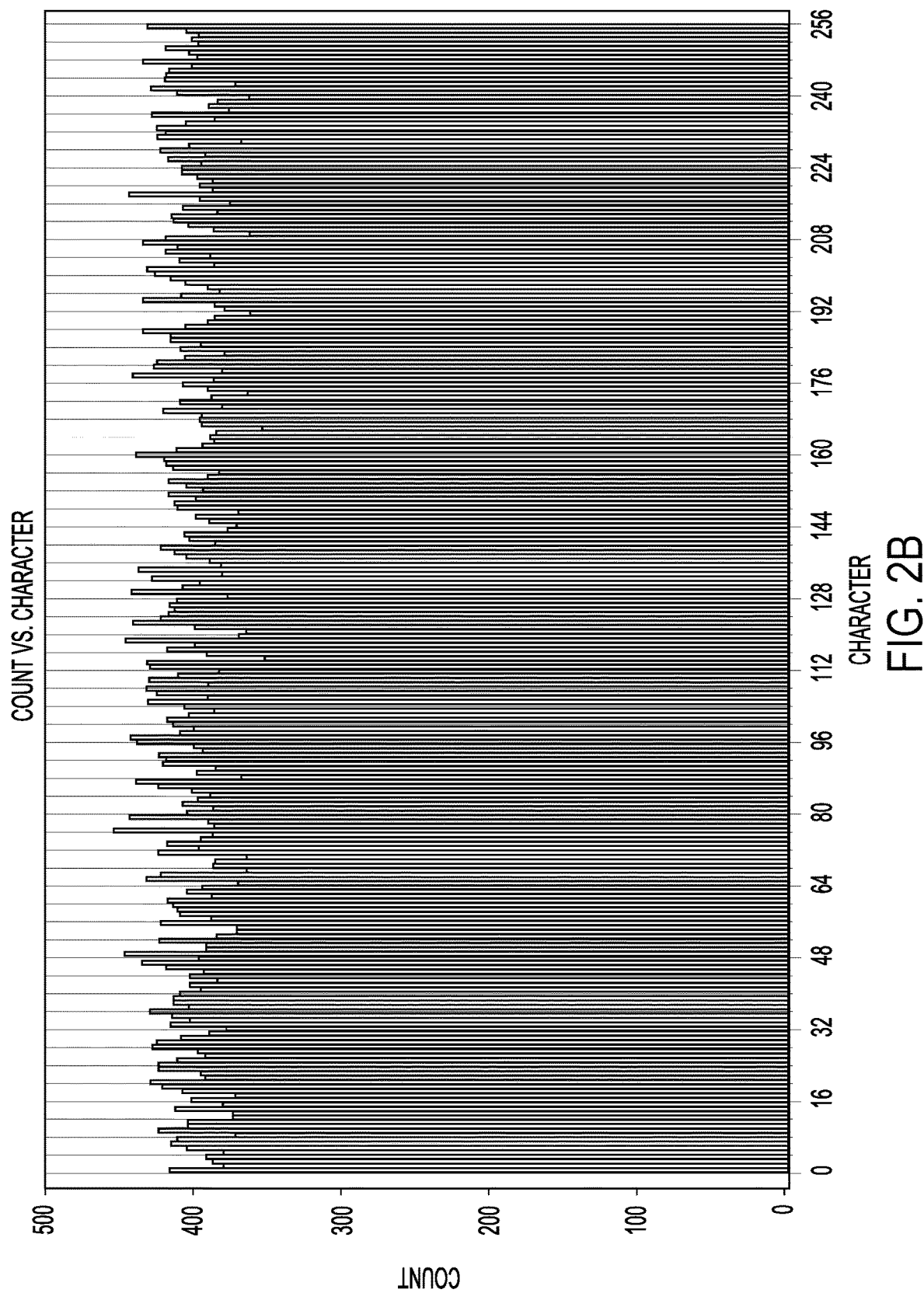
FIG. 2B is an example histogram depicting a character count of the collection of data of FIG. 2A after encryption.

FIG. 2B is an example histogram depicting a character count of the same collection of data in FIG. 2A after encryption. As shown in FIG. 2B, encryption results in much less variation in the frequency of use among the different characters. This represents a higher level of entropy in the collection of data as compared to the entropy level of the unencrypted version of the collection of data in FIG. 2A. As discussed in more detail below, whether a collection of data has been encrypted can be detected by calculating an entropy indicator that indicates a level of entropy for the collection of data and comparing it to a previous entropy indicator for the collection of data. Continuing with the example from FIG. 2A, if the average count for all the characters in FIG. 2B is 400 characters, an entropy indicator for the encrypted collection of data of FIG. 2B would be greater than the entropy indicator for the unencrypted collection of data of FIG. 2A, since more characters in FIG. 2B exceed the average count than in FIG. 2A.

Although FIGS. 2A and 2B depict the entropy level using a histogram, other methods of representing a level of entropy can use a Shannon entropy, a chi-squared distribution, or a Monte Carlo Pi approximation. In the case of using Shannon entropy, the entropy indicator can provide an average minimum number of bits needed to represent a symbol or character. The Shannon entropy for a collection of data can be calculated using the formula:

$$H(X) = -\sum_{i=1}^{n} P(x_i) \log_2 P(x_i)$$

where $P(x_i)$ is the probability of a given symbol or character in the collection of data, and $H(X)$ is the average minimum number of bits needed to represent a symbol or character in the collection of data. In some cases, $H(X)$ can be rounded up to an integer value.

Figure 2C:
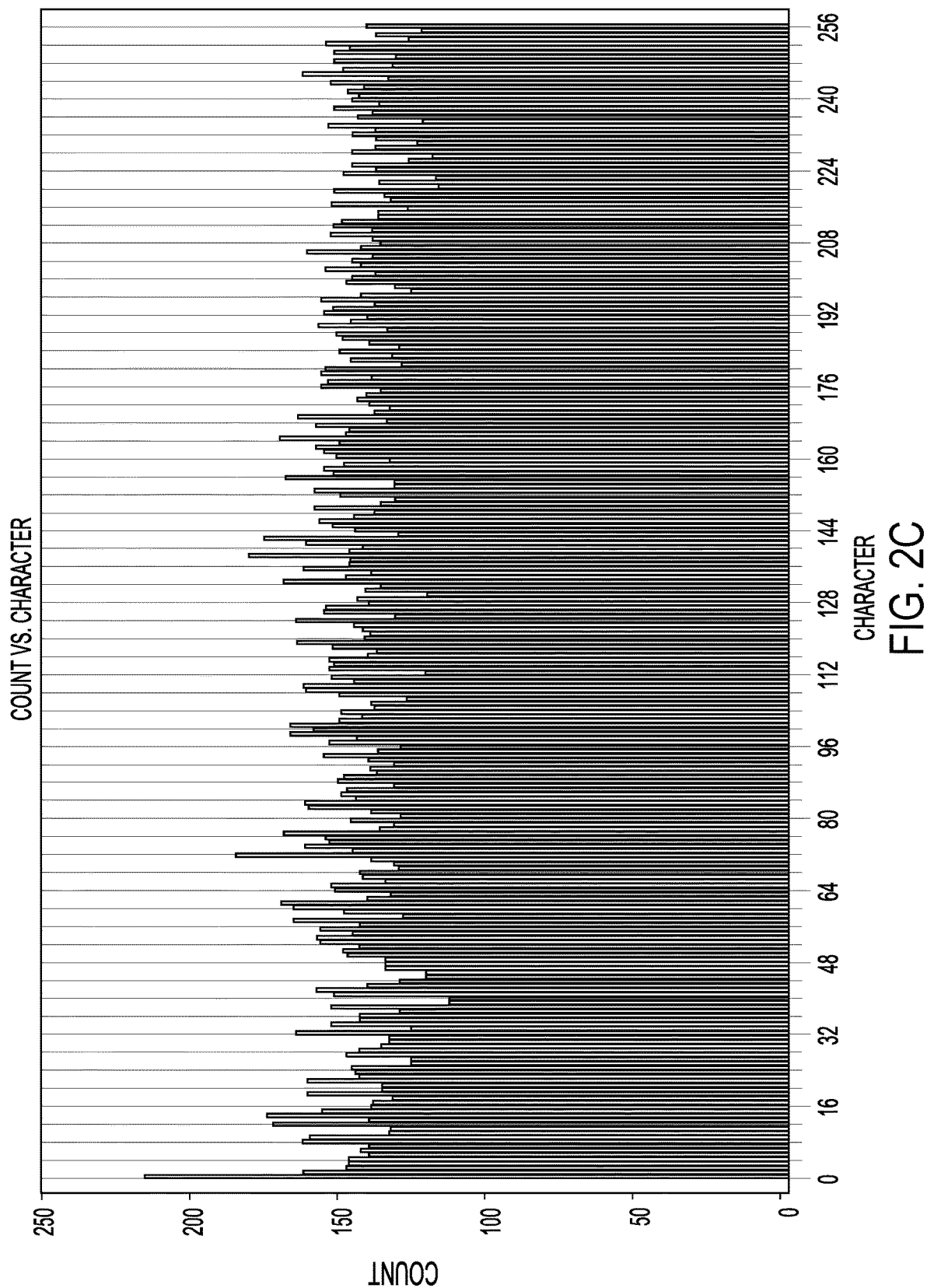
FIG. 2C is an example histogram depicting a character count of the collection of data of FIG. 2A after compression.

FIG. 2C is an example histogram depicting a character count of the collection of data of FIG. 2A after compression. As shown in FIG. 2C, the average character count is approximately 150, which is less than the average character count of the encrypted collection of data of FIG. 2B. As with the example of encryption in FIG. 2B, the frequency of characters used in the collection of data are more evenly distributed as compared to the unencrypted and uncompressed version of the collection of data in FIG. 2A. However, the histogram of FIG. 2C shows more variation in the frequency distribution than the encrypted version of the collection of data in FIG. 2B with more high frequency peaks above the average count. It is therefore possible to differentiate between collections of data that have been encrypted and collections of data that have been compressed, since an encrypted version of a collection of data will have a higher entropy level than a compressed and unencrypted version of the collection of data. As discussed in more detail below with reference to FIG. 7, the amount of data used to calculate an entropy indicator for a collection of data may be increased to increase the sensitivity for detecting encryption.

In addition, it is possible to detect whether a collection of data, such as a file, has been compressed based on an extension, file type, or object type used. In the example of a file, a compressed file typically receives a new extension or is stored as a new file altogether. For files that are already compressed, such as, for example, an mp3, mp4, jpeg, or zip file type, the encryption of such compressed files can be detected based on a change in the entropy level or entropy indicators for the file. In some implementations, processor 102 of host 101 or controller 112 of DSD 108 may use a higher sensitivity for encryption detection for file or object types that are usually compressed by using more data from such files or objects in calculating an entropy indicator, as compared to file or object types that are not usually compressed.

Figure 2D:
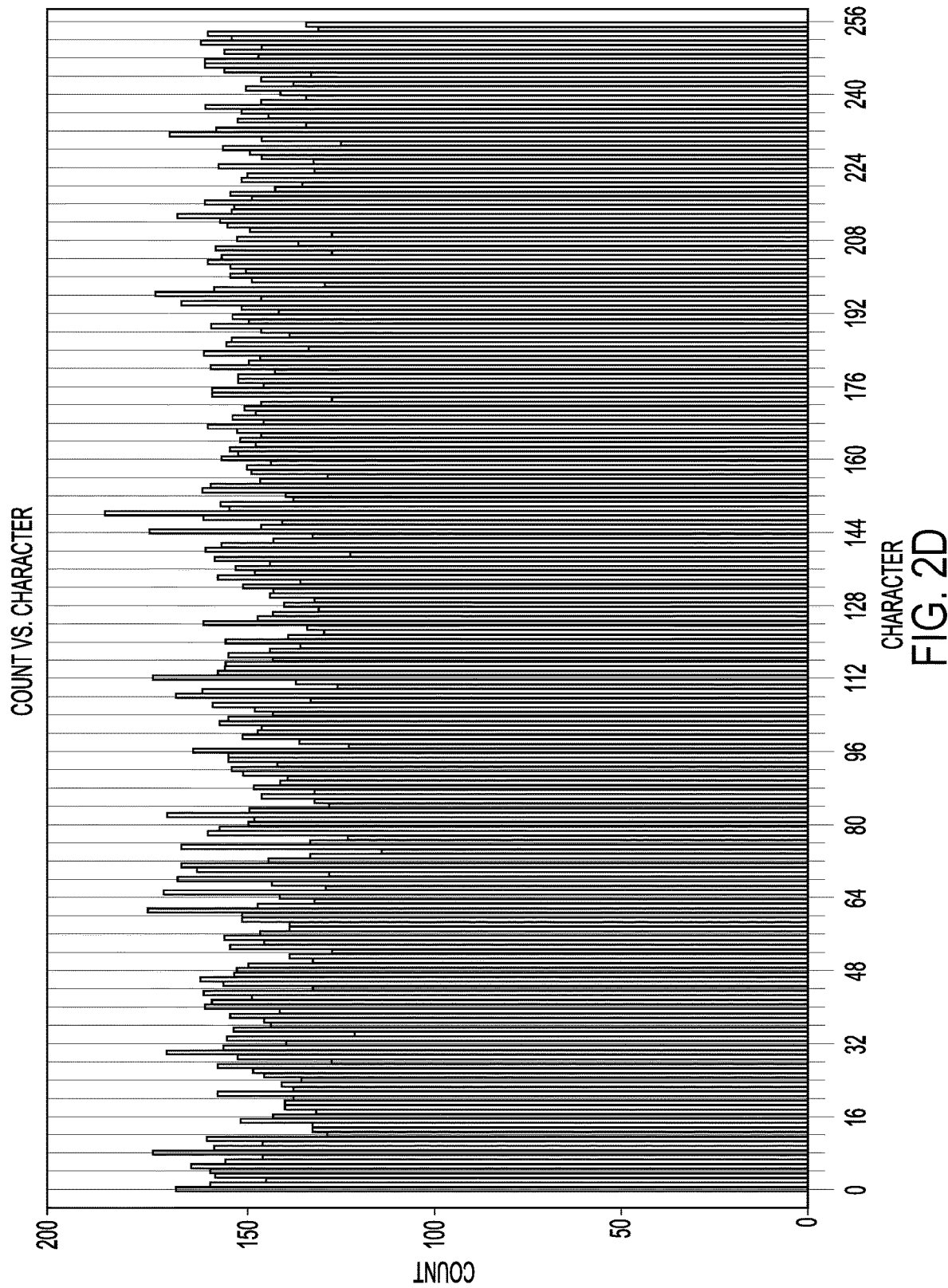
FIG. 2D is an example histogram depicting a character count of the compressed collection of data of FIG. 2C after encryption.

FIG. 2D is an example histogram depicting a character count of the compressed collection of data of FIG. 2C after it has been encrypted. As shown in FIG. 2D, the relatively high peaks of FIG. 2C have been lowered due to the deliberately random distribution of characters in the encrypted version of the collection of data in FIG. 2D. As described below in more detail, the encryption detection processes in the present disclosure can compare entropy indicators for one or more collections of data at different points in time to determine at least one of whether to back up the collection of data and whether to retain an earlier backup of the collection of data.

Figure 3:
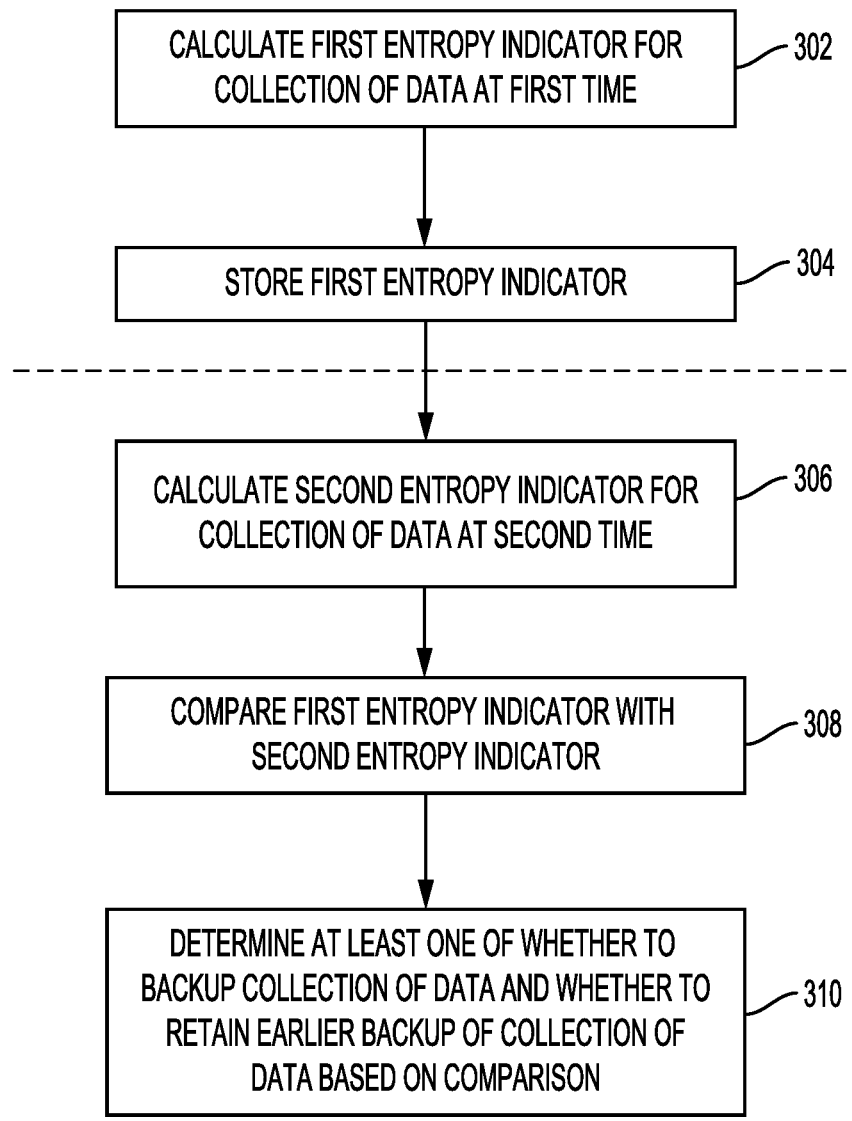
FIG. 3 is a flowchart for an encryption detection and backup management process according to an embodiment.

FIG. 3 is a flowchart for an encryption detection and backup management process that can be performed by application 14 executed by processor 102 or by firmware 16 executed by controller 112 according to some embodiments. The process of FIG. 3 can be performed in response to various trigger conditions, such as when a collection of data is to be stored, backed up (e.g., copied), or after a collection of data has been modified in non-volatile storage 116 of DSD 108. The process of FIG. 3 may also be performed as part of a periodic check for unauthorized encryption or may be performed in response to more than a threshold number of collections of data being modified.

In the example process of FIG. 3, a first entropy indicator is calculated at a first time for a collection of data in block 302. The entropy indicator indicates a level of entropy for the collection of data and may use, for example, at least one of a Shannon entropy, a chi-squared distribution, a histogram of values, and a Monte Carlo Pi approximation to calculate the entropy indicator for the collection of data. In some implementations, the output of such calculation methods may be scored or compared to different threshold values to provide the entropy indicator.

For example, a Shannon entropy level of less than 2.0 bits may be represented by an entropy indicator of 0, while a Shannon entropy greater than or equal to 2.0 but less than 2.5 may be represented by an entropy indicator of 1, and a Shannon entropy greater than or equal to 2.5 may be represented by an entropy indicator of 2. In other implementations, the output of the calculation method itself may be used as the entropy indicator with or without rounding the output to an integer value.

In block 304, the entropy indicator calculated in block 302 is stored. In some implementations, the calculated entropy indicator can be stored in DSD memory 114 as part of entropy indicators 18 or may be stored in both DSD memory 114 and non-volatile storage 116. In other implementations, the calculated entropy indicator may be stored outside of DSD 108, such as in host memory 104. The storage of the calculated entropy indicator in block 304 can also include associating the entropy indicator with the collection of data, such as by associating the entropy indicator with a file name or other identifier of the collection of data.

In block 306, a second entropy indicator for the collection of data is calculated at a second time. The dashed line in FIG. 3 between blocks 304 and 306 can signify a break in the process from when the first entropy indicator was calculated at the first time. The recalculation of the entropy indicator at the second time can be for a current or later version of the collection of data, which may or may not have been modified since the calculation of the first entropy indicator at the first time. In this regard, the recalculation of the entropy indicator can be after a predetermined period of time, may be in response to the collection of data being modified, or may be in response to a request to back up the collection of data. In other examples, the recalculation of the entropy indicator for the collection of data can be performed as part of a periodic check for unauthorized encryption or may be in response to more than a threshold number of collections of data being modified.

In block 308, the first entropy indicator is compared to the second entropy indicator. The second entropy indicator can serve as a check to see if the entropy level for the collection of data has increased. As discussed above with reference to the examples of FIGS. 2A to 2D, an increase in entropy can indicate that a collection of data has become encrypted. In some implementations, controller 112 or processor 102 may compare the previous entropy indicator to the recalculated entropy indicator to determine if the values for both entropy indicators are the same or within a threshold amount of each other.

In block 310, it is determined whether to back up or copy the collection of data and/or to retain an earlier backup of the collection of data based on the comparison of entropy indicators in block 308. In one example, processor 102 or controller 112 may determine that the second entropy indicator is greater than the first entropy indicator or that the second entropy indicator differs from the first entropy indicator. In such cases, processor 102 or controller 112 may determine not to back up or copy the current or second version of the collection of data and to retain an earlier backup of the collection of data. In such cases, an application (e.g., application 14) or a user of host 101 may be informed that the collection of data has been encrypted. In addition, some embodiments may check an encryption log to determine whether host 101 intentionally encrypted the collection of data since storing the first entropy indicator to provide the application or the user with more information on when the collection of data was encrypted and which application encrypted the collection of data.

The foregoing encryption detection process can ordinarily detect unauthorized encryption earlier than conventional ransomware detection using tripwire files. In the encryption detection and backup management process of FIG. 3, each collection of data (e.g., each file) can be checked for encryption when the collection of data is modified, stored, or requested to be backed up, as opposed to only relying on specific files that may be skipped for encryption by ransomware. In addition, the foregoing process also allows for the retention of earlier backups of unencrypted versions or notification to a user or application before overwriting an earlier backup with a new backup of an encrypted version. As compared to conventional ransomware detection, the process of FIG. 3 can also allow for backing up or copying to continue for unencrypted collections of data, despite the detection of encryption of other collections of data. This can ordinarily allow a user to protect their data by backing the data up after detection of the unauthorized or otherwise unwanted encryption.

Figure 4:
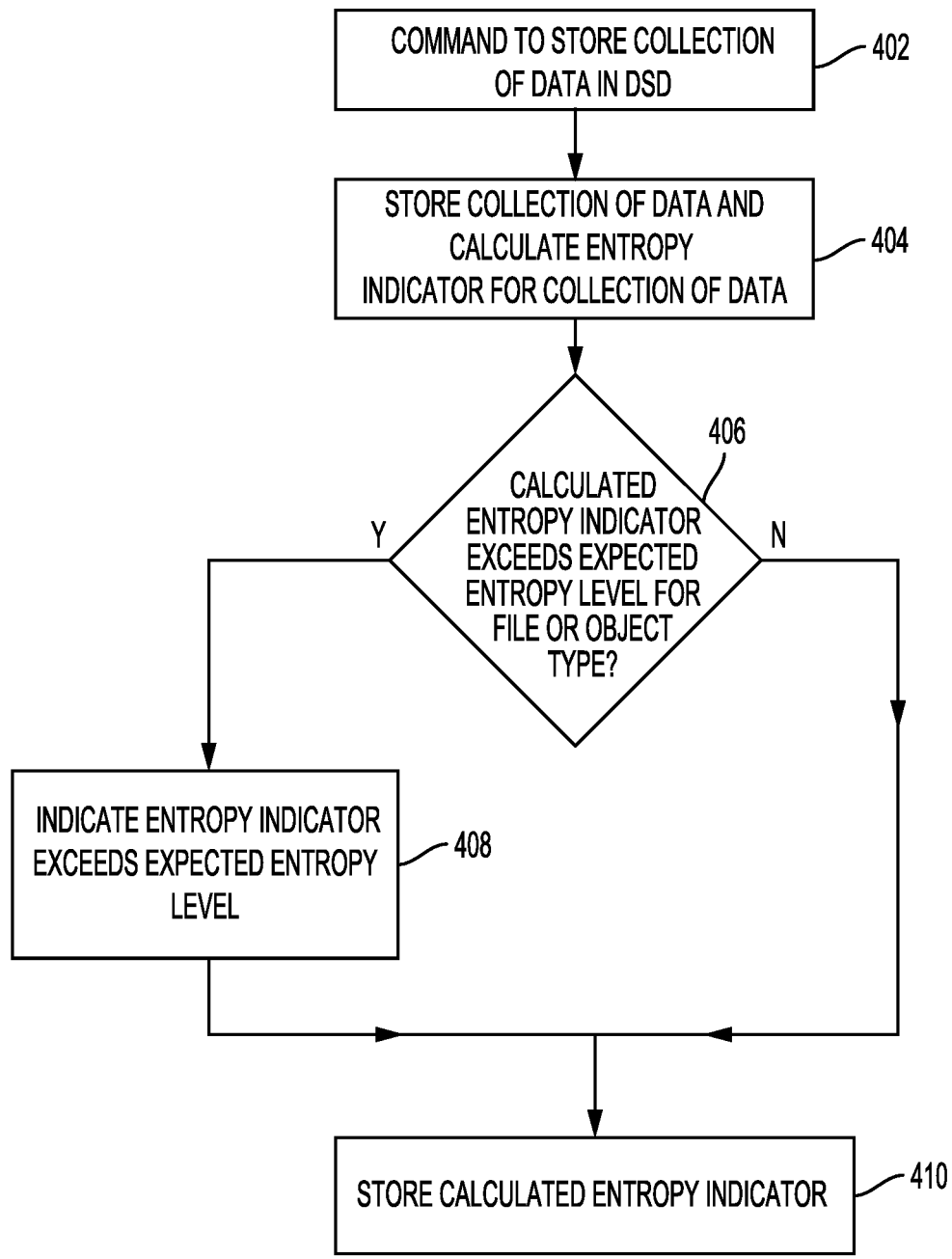
FIG. 4 is a flowchart for a storage and entropy indicator calculation process according to an embodiment.

FIG. 4 is a flowchart for a storage and entropy indicator calculation process that can be performed by application 14 executed by processor 102 or by firmware 16 executed by controller 112 according to some embodiments. In some implementations, the process of FIG. 4 may be performed for all collections of data stored in non-volatile storage 116 so that an entropy indicator is calculated for each collection of data stored in non-volatile storage 116. In block 402, a command is received to store a collection of data in DSD 108. The command may come from, for example, an application executing on host 101.

In block 404, the collection of data is stored in non-volatile storage 116 of DSD 108 (e.g., as part of files 20 in FIG. 1), and an entropy indicator is calculated for the collection of data. The entropy indicator may be calculated before or after storing the collection of data in non-volatile storage 116. As discussed above, processor 102 or controller 112 may use at least one of a Shannon entropy, a chi-squared distribution, a histogram of values, and a Monte Carlo Pi approximation to calculate the entropy indicator.

In block 406, processor 102 or controller 112 compares the calculated entropy indicator to an expected entropy level for a file type or object type for the collection of data. In some implementations, a memory of DSD 108, such as DSD memory 114 can store a data structure associating different file types or object types with different expected entropy levels. For example, certain compressed audio or video file types such as mp3 or mp4 file types may be associated with a higher expected entropy level (e.g., a Shannon entropy of 3) than other file types such as a word processor document type such as a doc file type (e.g., a Shannon entropy of 1). The check in block 406 can be used to make an initial determination as to whether the collection of data being stored is encrypted.

If it is determined in block 406 that the calculated entropy indicator exceeds the expected entropy level, processor 102 or controller 112 in block 408 indicates that the calculated entropy indicator exceeds the expected entropy level. In implementations where controller 112 determines that the calculated entropy indicator exceeds the expected entropy level, controller 112 can send a notification to host 101 to indicate that the calculated entropy indicator exceeds the expected entropy level. In some cases, this can be a notification that the collection of data stored in block 404 was encrypted.

In implementations where processor 102 determines that the calculated entropy indicator exceeds the expected entropy level in block 406, processor 102 in block 408 can notify an application executing on host 101, such as an application responsible for backing up files (e.g., application 14) or the application that requested the storage of the collection of data in block 402. In some cases, application 14 may track the number of encrypted collections of data (e.g., files or objects) being stored on DSD 108 or an overall entropy for user data stored in non-volatile storage 116 (e.g., files 20 in FIG. 1) in order to adjust a sensitivity of encryption detection, as discussed in more detail below with reference to FIG. 7.

In block 410, the entropy indicator calculated in block 404 is stored. In some implementations, the entropy indicator may be stored in DSD 108, such as in non-volatile storage 116 and/or DSD memory 114 as part of entropy indicators 18. In other implementations, the entropy indicator may be stored outside of DSD 108, such as in host memory 104. As discussed above with reference to the entropy detection and backup management process of FIG. 3, the entropy indicator for the collection of data can be used to detect unauthorized encryption of the collection of data later on by comparing the entropy indicator with a recalculated entropy indicator for a current or second version of the collection of data. The storage and entropy indicator calculation process discussed above for FIG. 4 can ordinarily allow for an earlier identification of unauthorized encryption by viruses that cause host 101 to store new encrypted collections of data with a different name in place of unencrypted versions of the collections of data.

Figure 5:
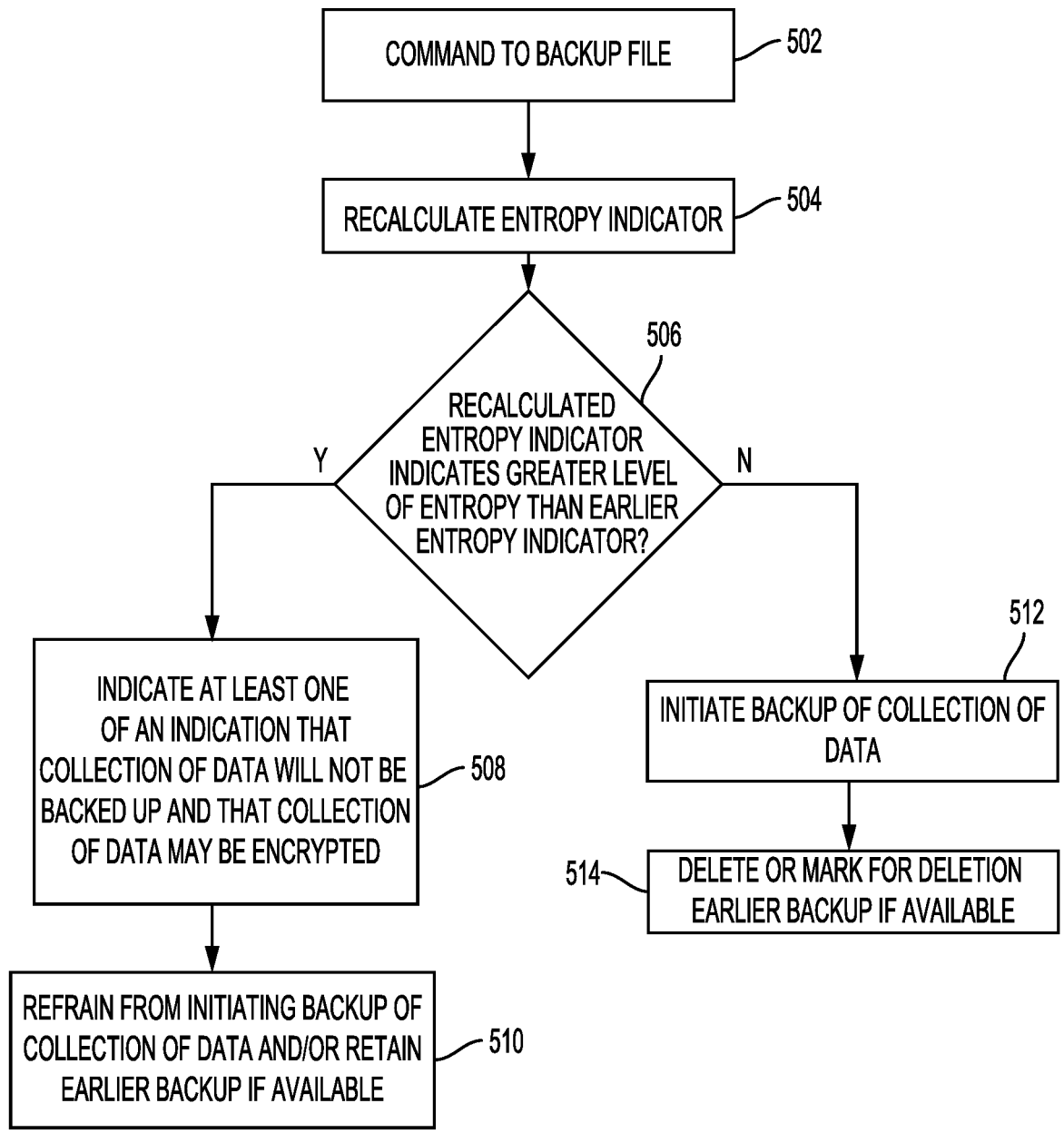
FIG. 5 is a flowchart for an encryption detection and backup management process according to an embodiment.

FIG. 5 is a flowchart for an encryption detection and backup management process that can be performed by application 14 executed by processor 102 or by firmware 16 executed by controller 112 according to some embodiments. In the example process of FIG. 5, a recalculated entropy indicator is used to determine whether a collection of data has been encrypted since calculation of a previous entropy indicator for the collection of data. As discussed below, the collection of data may not be backed up if it is determined to be encrypted and/or an earlier backup of the collection of data may be retained in case the encryption was the result of ransomware or other type of computer virus.

In block 502, a command to back up or copy a collection of data stored in non-volatile storage 116 is generated by application 14 on host 101 or received by controller 112 of DSD 108. The back up command may come from, for example, application 14 or from another application executing on host 101.

In block 504, processor 102 or controller 112 recalculates the entropy indicator for the collection of data. The recalculation of the entropy indicator can serve as a check for unauthorized or otherwise unwanted encryption before overwriting an earlier backup of the collection of data.

In block 506, processor 102 or controller 112 determines whether the recalculated entropy indicator in block 504 indicates a greater level of entropy than an earlier entropy indicator for the collection of data. As discussed above with reference to the examples of FIGS. 2A to 2D, an increase in entropy can indicate that a collection of data has become encrypted. In some implementations, controller 112 or processor 102 may compare the earlier entropy indicator to the recalculated entropy indicator to determine if the values for both entropy indicators are the same or within a threshold amount of each other. For example, there may be a certain tolerance allowed for entropy changes within a threshold increase in entropy, which may be due to other changes made to the collection of data that do not involve encryption. In this regard, the increase in entropy caused by encryption is typically much greater than entropy increases caused by other changes, such as when modifying particular portions of a collection of data.

If it is determined in block 506 that there is a greater level of entropy, processor 102 or controller 112 in block 508 indicates at least one of an indication that the collection of data will not be backed up and that the collection of data is encrypted or likely encrypted. In implementations where controller 112 determines that the recalculated entropy indicator indicates a greater level of entropy, controller 112 can send a notification to host 101 to indicate that the collection of data will not be backed up in response to the command to back up the collection of data. The notification can include, for example, an indication that the current version of the collection of data is encrypted or likely encrypted.

In implementations where processor 102 in block 506 determines that the recalculated entropy indicator indicates a greater entropy level, processor 102 in block 508 can notify an application executing on host 101 or a user that the collection of data will not be backed up and/or that the collection of data may be encrypted. The notification may be sent or provided to an application responsible for backing up data (e.g., application 14) or the application that requested the modification or the back up. In some cases, application 14 may track the number of encrypted collections of data being stored on DSD 108 or an overall entropy for user data (e.g., files 20 in FIG. 1) in order to adjust a sensitivity of encryption detection, as discussed in more detail below with reference to FIG. 7.

In block 510 of FIG. 5, processor 102 or controller 112 refrains from initiating a backup of the collection of data and/or retains an earlier backup of the collection of data in cases where a new backup would ordinarily overwrite the earlier backup. In some implementations, this can include DSD 108 not requesting a backup from host 101 or not performing a backup on its own. In other implementations, this can include host 101 not requesting a backup from DSD 108 or not performing a backup on its own.

In some implementations, a current version of the collection of data may be backed up and an earlier backup kept in case the encryption detected in the current version was unauthorized or otherwise unwanted by the user. Retaining the earlier backup can ordinarily allow a user to recover an earlier version of the collection of data in cases where ransomware or another type of computer virus has encrypted the current version.

In some cases, a notification to the user, to an application, or to host 101 may be postponed until a certain number of encrypted collections of data have been detected to reduce nuisance notifications, since retaining the earlier backups of such encrypted collections of data can allow for recovery of the earlier versions. The notification in block 508 can be provided with the first collection of data detected as encrypted to provide as early a warning as possible. In some implementations, a user may need to confirm whether to proceed with backing up the collection of data.

If it is determined in block 506 that the recalculated entropy indicator does not indicate a greater level of entropy, processor 102 or controller 112 in block 512 initiates a backup or copy of the collection of data. In the example of FIG. 1, a back up of a file from files 20 may be added to backed up files 22. In block 514, an earlier backup is deleted or marked for deletion, which can help make room for more backups. As noted above with reference to FIG. 1, some implementations may additionally or alternatively back up or copy collections of data onto another DSD external to DSD 108.

The foregoing encryption detection and backup management process of FIG. 5 can ordinarily improve the protection of data from unauthorized or unwanted encryption by retaining an earlier backup and/or by refraining from creating a new backup for a possibly encrypted collection of data.

Figure 6:
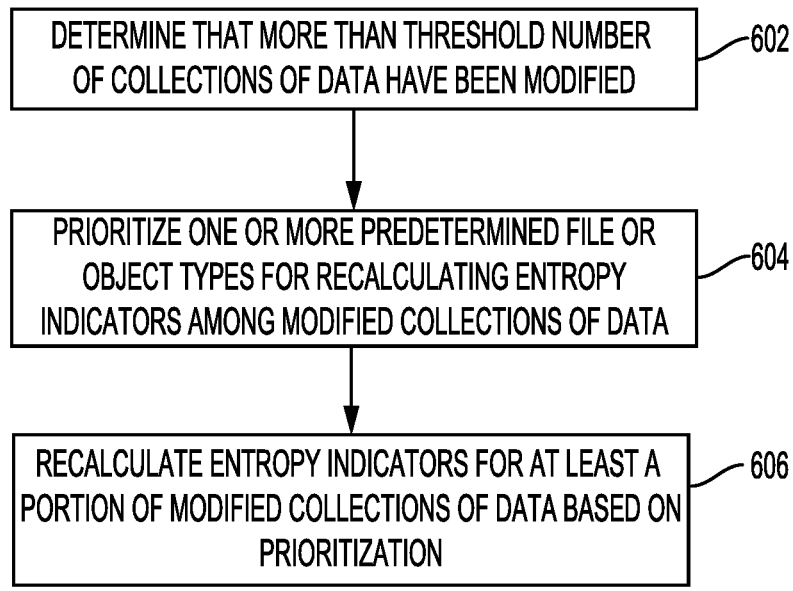
FIG. 6 is a flowchart for an encryption detection process including prioritization for recalculating entropy indicators according to an embodiment.

FIG. 6 is a flowchart for an encryption detection process including prioritization of one or more file or object types for recalculating entropy indicators. The process of FIG. 6 can be performed by application 14 executed by processor 102 or by firmware 16 executed by controller 112 according to some embodiments.

In block 602, processor 102 or controller 112 determines that more than a threshold number of collections of data have been modified. In this regard, application 14 at host 101 or controller 112 may keep track of which collections of data have been modified or a total count of modified collections of data. In some implementations, the number of collections of data that have been modified may be tracked during a time period so that entropy indicators are recalculated when more than a threshold number of collections of data have been modified during the time period. The time period could be an amount of run time for DSD 108 or may be a predetermined amount of time such as daily, weekly, or monthly.

In block 604, processor 102 or controller 112 optionally prioritizes one or more file types or object types (e.g., photos, videos, word processor documents) for recalculating entropy indicators for the modified collections of data. The prioritization can include determining an order for recalculating entropy indicators or can include identifying a subset of the modified collections of data for which to recalculate entropy indicators. In this regard, ransomware and other viruses may target specific collections of data that are usually more valuable to users or files that have not been accessed recently to hide the encryption. For example, video files, audio files, word processing files, or image files may be prioritized for recalculating entropy indicators since these types of files may be targeted by ransomware. This can allow for unauthorized encryption to be detected sooner or for the detection of unauthorized encryption using less processing and memory resources by not needing to recalculate entropy indicators for a larger number of collections of data before detecting the unauthorized encryption.

In addition, the last modification time or the creation time of the collection of data may be used for prioritizing the recalculation of entropy indicators (i.e., determining which collections of data should be checked or an order for checking collections of data). In some cases, collections of data that have an older creation date can be prioritized since ransomware or other viruses may target these collections of data to avoid detection. In other cases, such as where the process of FIG. 6 is performed more frequently, recently modified collections of data can be prioritized to detect unauthorized encryption.

In block 606, processor 102 or controller 112 recalculates entropy indicators for at least a portion of the modified collections of data based on the prioritization in block 604. As noted above, the process of FIG. 6 may include recalculating the entropy indicators for all modified collections of data, or may recalculate entropy indicators for only a subset of the modified collections of data.

Figure 7:
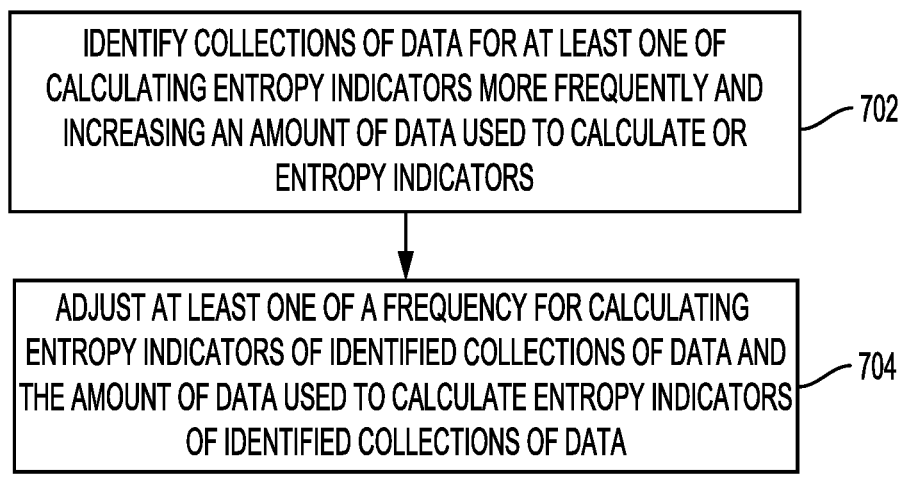
FIG. 7 is a flowchart for a detection sensitivity adjustment process according to an embodiment.

FIG. 7 is a flowchart for a detection sensitivity adjustment process that can be performed application 14 executed by processor 102 or by firmware 16 executed by controller 112 according to some embodiments. As noted above, the number of encrypted collections of data being stored on DSD 108 may be tracked or an overall entropy for user data stored in non-volatile storage 116 (e.g., files 20 in FIG. 1) may be tracked in order to adjust a sensitivity of encryption detection. In cases where the overall entropy of user or host data is tracked, processor 102 or controller 112 may use an average value of entropy indicators 18 or may use a sum of the entropy indicators 18. When the overall level of entropy exceeds a threshold, processor 102 or controller 112 may increase the sensitivity of detection for all collections of data or may identify particular collections of data for using increased sensitivity, as discussed below with reference to block 704.

In some examples, the detection sensitivity can be increased by increasing the frequency at which entropy indicators are recalculated for collections of data, such as by decreasing the period of time used for the encryption detection process of FIG. 6 above. In other examples, the amount of data used to recalculate or initially calculate entropy indicators can be increased to increase the sensitivity of the encryption detection. Although it may take longer to recalculate or calculate entropy indicators using more data per collection of data, the use of more data per collection of data can provide a more accurate representation of the entropy level for the collection of data.

In the example process of FIG. 7, processor 102 or controller 112 in block 702 identifies collections of data (e.g., files and/or data objects) for at least one of recalculating entropy indicators more frequently and increasing an amount of data used to calculate or recalculate entropy indicators. The identified data can be high value collections of data or likely to be targeted collections of data as discussed above. In some implementations, processor 102 or controller 112 may identify a collection of data based on attributes or metadata such as a type for the collection of data (e.g., a file type or object type), a name for the collection of data (e.g., file names or object names), a size for the collection of data, an owner for the collection of data, a creation time for the collection of data, or a last modification time for the collection of data.

In other implementations, processor 102 or controller 112 may identify collections of data in block 702 based on access characteristics. For example, an identified collection of data can be associated with access characteristics including at least one of host hardware used to access the collection of data, host software used to access the collection of data, a location of a host used to access the collection of data, and an Internet Service Provider (ISP) used to access the collection of data.

Specific high-risk hosts or host hardware that may be vulnerable to a virus can be associated with certain collections of data stored in non-volatile storage 116. Similarly, collections of data accessed by certain high-risk software can similarly be identified in block 702 for adjusting the sensitivity of encryption detection. The identification of collections of data in block 702 can additionally or alternatively be based on a location of a host or hosts accessing the collections of data or an ISP used by the host, as described below with reference to FIG. 8.

Figure 8:
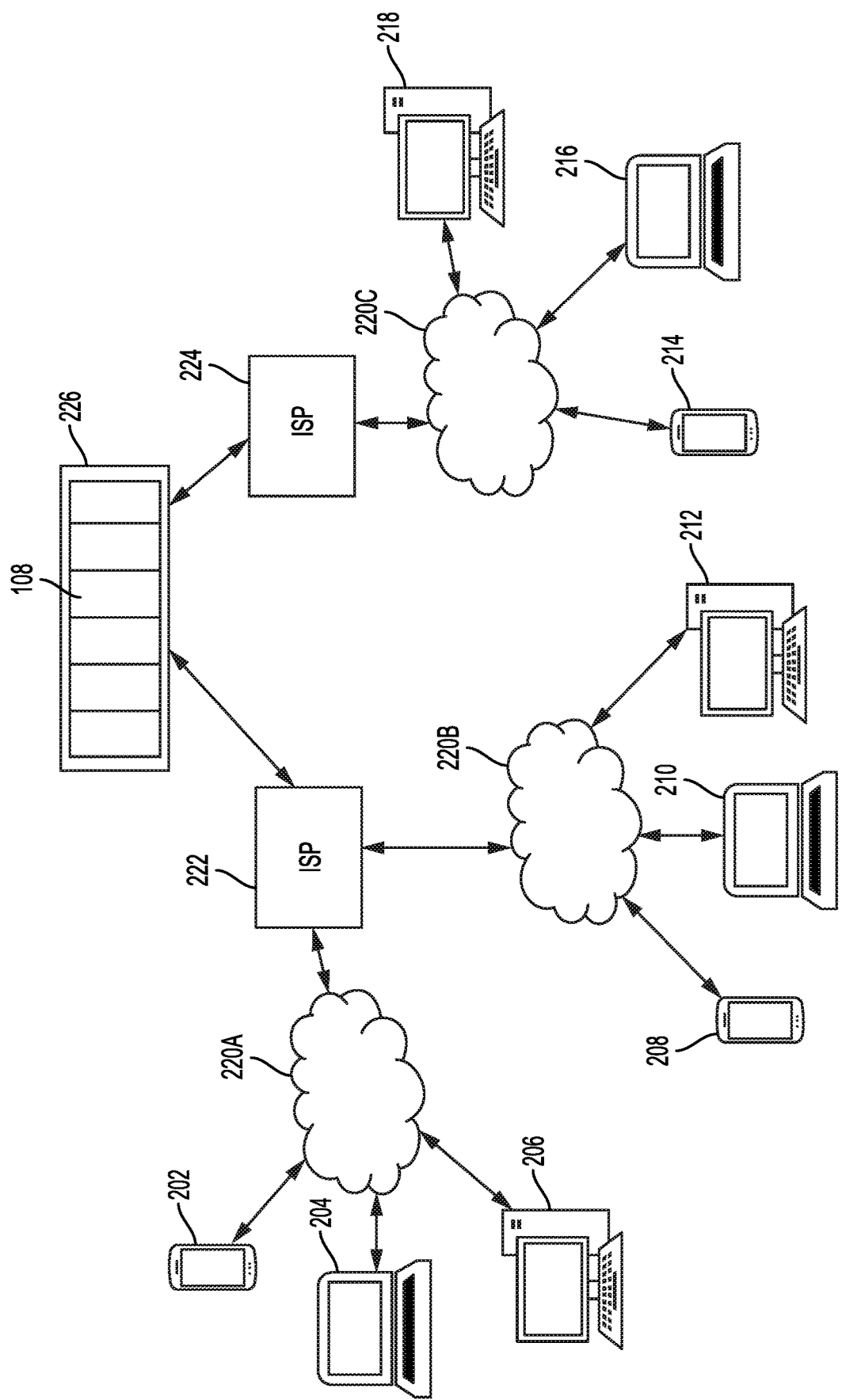
FIG. 8 is an example network diagram according to an embodiment.

FIG. 8 provides an example network diagram that includes networks 220A, 220B, and 220C that communicate with server 226 via ISPs 222 and 224. As shown in the example of FIG. 8, server 226 includes DSD 108.

Each of networks 220A, 220B, and 220C can include a variety of different types of host hardware and software. In the example of FIG. 8, network 220A includes smartphone 202, laptop 204, and desktop 206. Network 220B includes smartphone 208, laptop 210, and desktop 212. Network 220C includes smartphone 214, laptop 216, and desktop 218.

DSD 108 or server 226 can associate collections of data stored in DSD 108 (e.g., files or objects) with any of the type of hardware or software used to access the collections of data, such as, for example, a particular smartphone manufacturer or OS, the network used to access the collections of data (i.e., network 220A, 220B, or 220C), or the ISP used to access the collections of data (i.e., ISP 222 or 224). In some implementations, DSD 108 or server 226 can use a combination of these access characteristics to identify collections of data that may be more vulnerable to ransomware or other types of viruses that may encrypt data stored in DSD 108. Other implementations may use different access characteristics than those discussed above to identify collections of data that should have a higher or lower level of encryption detection.

Returning to the sensitivity adjustment process of FIG. 7, processor 102 or controller 112 adjusts at least one of a frequency for calculating entropy indicators and the amount of data used to calculate entropy indicators for the collections of data identified in block 702. This can allow for a higher encryption detection sensitivity for collections of data with particular access characteristics and/or with certain attributes, such as at least one of a file or object name, a file or object type, a file or object size, a file or object owner, a creation time of the file or object, and a last modification time of the file or object.

For example, certain file types may indicate that the file is compressed, such as, for example, an mp3, mp4, jpeg, or zip file type. As discussed above with reference to FIGS. 2C and 2D, it may be more difficult to detect encryption of a compressed file. The process of FIG. 7 may therefore increase the sensitivity of encryption detection for file types that are typically compressed so that more data from the file is used to recalculate or calculate entropy indicators for the file. In another example, the process of FIG. 7 may increase the sensitivity of encryption detection for files or data objects over a certain size so that more data is used for larger files or larger data objects when calculating or recalculating an entropy indicator.

As discussed above, the encryption detection of the present disclosure ordinarily allows for earlier detection of unauthorized or otherwise unwanted encryption of data than conventional encryption detection that may use tripwire files. Such early detection can allow for protective measures to be taken earlier to save user data from becoming encrypted. In addition, the foregoing encryption detection can also allow for unencrypted data, such as files or data objects, to continue to be backed up, rather than preventing all backing up or copying of data in a system that may be infected with ransomware or another type of virus.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor, controller, or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or a controller, such as, for example, a Central Processing Unit (CPU), a microprocessor, an MCU, a DSP, an ASIC, an FPGA, or other programmable logic device, discrete gate or transistor logic, discrete hardware components, or any combination thereof designed to perform the functions described herein. A processor or controller may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor or a controller, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or controller can read information from, and write information to, the storage medium. In the alternative, the storage medium may be integral to the processor or controller. The storage medium and the processor or controller may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
at least one memory for storing a plurality of collections of data including a first collection of data and a second collection of data; and
a controller configured to:
calculate a first entropy indicator at a first time for the whole first collection of data using a first amount of data from the first collection of data;
calculate a second entropy indicator at a second time for the whole first collection of data using the first amount of data from the first collection of data;
compare the first entropy indicator with the second entropy indicator;
determine at least one of whether to back up the first collection of data and whether to retain an earlier backup of the first collection of data based on the comparison of the first entropy indicator with the second entropy indicator; and
identify the second collection of data to use a second amount of data from the second collection of data to recalculate an entropy indicator for the whole second collection of data, wherein the second amount of data is greater than the first amount of data to increase a sensitivity for detecting encryption of the second collection of data.

2. The DSD of claim 1, wherein the first collection of data is a file, an object, or a contiguous range of blocks, and wherein the controller is further configured to calculate a first entropy indicator for each collection of data stored in the at least one memory.

3. The DSD of claim 1, wherein the controller is further configured to:
initiate a backup of the first collection of data in response to determining that the second entropy indicator indicates an equal or lower level of entropy than the first entropy indicator; and
refrain from initiating a backup of the first collection of data in response to determining that the second entropy indicator indicates a greater level of entropy than the first entropy indicator.

4. The DSD of claim 1, wherein in response to determining that the second entropy indicator indicates a greater level of entropy than the first entropy indicator, the controller is further configured to send to a host at least one of an indication that the first collection of data will not be backed up and that the first collection of data may be encrypted.

5. The DSD of claim 1, wherein the controller is further configured to:
calculate the first entropy indicator for the first collection of data in response to a command to store the first collection of data in the DSD; and
calculate the second entropy indicator in response to the first collection of data being modified or a command to back up the first collection of data.

6. The DSD of claim 1, wherein the controller is further configured to use at least one of a Shannon entropy, a chi-squared distribution, a histogram of values, and a Monte Carlo Pi approximation to calculate the first entropy indicator for the first collection of data.

7. The DSD of claim 1, wherein the controller is further configured to identify a third collection of data of the plurality of collections of data to use the second amount of data from the third collection of data to calculate an initial entropy indicator for the whole third collection of data.

8. The DSD of claim 1, wherein the controller is further configured to:
determine whether at least one of the first entropy indicator and the second entropy indicator exceed an expected entropy level for a file type or an object type for the first collection of data; and
in response to determining that at least one of the first entropy indicator and the second entropy indicator exceed the expected entropy level, send an indication to a host indicating that an entropy level for the first collection of data exceeds the expected entropy level.

9. The DSD of claim 1, wherein the controller is further configured to:
determine that more than a threshold number of collections of data of the plurality of collections of data have been modified; and
in response to determining that more than the threshold number of collections of data have been modified, recalculate entropy indicators for at least a portion of the modified collections of data.

10. The DSD of claim 9, wherein the controller is further configured to prioritize one or more predetermined file types or object types for recalculating the entropy indicators among the modified collections of data.

11. The DSD of claim 1, wherein the controller is further configured to adjust at least one of a frequency for calculating entropy indicators and an amount of data used to calculate entropy indicators.

12. The DSD of claim 1, wherein in identifying the second collection of data, the controller is further configured to identify the second collection of data based on access characteristics including at least one of host hardware used to access the second collection of data, host software used to access the second collection of data, a location of a host used to access the second collection of data, and an Internet Service Provider (ISP) used to access the second collection of data.

13. The DSD of claim 1, wherein in identifying the second collection of data, the controller is further configured to identify the second collection of data based on attributes including at least one of a name for the second collection of data, a type for the second collection of data, a size for the second collection of data, an owner for the second collection of data, a creation time for the second collection of data, and a last modification time for the second collection of data.

14. The DSD of claim 1, wherein the DSD includes a Direct Attached Storage (DAS) device, a Network Attached Storage (NAS) device, or a Storage Area Network (SAN) device.

15. The DSD of claim 1, wherein the DSD includes a Hard Disk Drive (HDD), a Solid State Drive (SSD), a Solid State Hybrid Drive (SSHD), a tape drive, or a storage array.

16. A method for managing backups, the method comprising:
calculating a first entropy indicator at a first time for a whole first collection of data stored in at least one memory using a first amount of data from the first collection of data;
calculating a second entropy indicator at a second time for the whole first collection of data using the first amount of data from the first collection of data;
comparing the first entropy indicator with the second entropy indicator;
determining at least one of whether to back up the first collection of data and whether to retain an earlier backup of the first collection of data based on the comparison of the first entropy indicator with the second entropy indicator; and
identifying a second collection of data to use a second amount of data from the second collection of data to recalculate an entropy indicator for the whole second collection of data, wherein the second amount of data is greater than the first amount of data to increase a sensitivity for detecting encryption of the second collection of data.

17. A host, comprising:
an interface configured to communicate with at least one Data Storage Device (DSD); and
means for:
calculating a first entropy indicator at a first time for a whole first collection of data stored in the at least one DSD using a first amount of data from the first collection of data;
calculating a second entropy indicator at a second time for the whole first collection of data using the first amount of data from the first collection of data;
comparing the first entropy indicator with the second entropy indicator;
determining at least one of whether to back up the first collection of data and whether to retain an earlier backup of the first collection of data based on the comparison of the first entropy indicator with the second entropy indicator; and identifying a second collection of data to use a second amount greater portion of data from the second collection of data to recalculate an entropy indicator for the whole second collection of data, wherein the second amount of data is greater than the first amount of data to increase a sensitivity for detecting encryption of the second collection of data.

18. The method of claim 16, wherein the first collection of data is a file, an object, or a contiguous range of blocks, and wherein the method further comprises calculating a first entropy indicator for each collection of data stored in the at least one memory.

19. The method of claim 16, further comprising:
initiating a backup of the first collection of data in response to determining that the second entropy indicator indicates an equal or lower level of entropy than the first entropy indicator; and
refraining from initiating a backup of the first collection of data in response to determining that the second entropy indicator indicates a greater level of entropy than the first entropy indicator.

20. The method of claim 16, wherein in response to determining that the second entropy indicator indicates a greater level of entropy than the first entropy indicator, the method further comprises sending to a host at least one of an indication that the first collection of data will not be backed up and that the first collection of data may be encrypted.

21. The method of claim 16, further comprising:
calculating the first entropy indicator for the first collection of data in response to a command to store the first collection of data; and
calculating the second entropy indicator in response to a command to modify the first collection of data or a command to back up the first collection of data.

22. The method of claim 16, wherein at least one of a Shannon entropy, a chi-squared distribution, a histogram of values, and a Monte Carlo Pi approximation is used to calculate the first entropy indicator for the first collection of data.

23. The method of claim 16, further comprising identifying a third collection of data to use the second amount of data from the third collection of data to calculate an initial entropy indicator for the whole third collection of data.

24. The method of claim 16, further comprising:
determining whether at least one of the first entropy indicator and the second entropy indicator exceed an expected entropy level for a file type or an object type for the first collection of data; and
in response to determining that at least one of the first entropy indicator and the second entropy indicator exceed the expected entropy level, sending an indication to a host indicating that an entropy level for the first collection of data exceeds the expected entropy level.

25. The method of claim 16, further comprising:
determining that more than a threshold number of collections of data have been modified; and
in response to determining that more than the threshold number of collections of data have been modified, recalculating entropy indicators for at least a portion of the modified collections of data.

26. The method of claim 25, further comprising prioritizing one or more predetermined file types or object types for recalculating the entropy indicators among the modified collections of data.

27. The method of claim 16, further comprising adjusting at least one of a frequency for calculating entropy indicators and an amount of data used to calculate entropy indicators.

28. The method of claim 16, wherein in identifying the second collection of data, the method further comprises identifying the second collection of data based on access characteristics including at least one of host hardware used to access the second collection of data, host software used to access the second collection of data, a location of a host used to access the second collection of data and an Internet Service Provider (ISP) used to access the second collection of data.

29. The method of claim 16, wherein in identifying the second collection of data, the method further comprises identifying the second collection of data based on attributes including at least one of a name for the second collection of data, a type for the second collection of data, a size for the second collection of data, an owner for the second collection of data, a creation time for the second collection of data, and a last modification time for the second collection of data.

30. A computer-readable storage medium storing computer-executable instructions for managing backups, wherein when the computer-executable instructions are executed by a controller or a processor, the computer-executable instructions cause the controller or the processor to:
calculate a first entropy indicator at a first time for a first whole collection of data stored in at least one memory using a first amount of data from the first collection of data;
calculate a second entropy indicator at a second time for the whole first collection of data using the first amount of data from the first collection of data;
compare the first entropy indicator with the second entropy indicator;
determine at least one of whether to back up the first collection of data and whether to retain an earlier backup of the first collection of data based on the comparison of the first entropy indicator with the second entropy indicator; and
identify a second collection of data to use a second amount of data from the second collection of data to recalculate an entropy indicator for the whole second collection of data, wherein the second amount of data is greater than the first amount of data to increase a sensitivity for detecting encryption of the second collection of data.

31. The computer-readable storage medium of claim 30, wherein the computer-readable storage medium forms part of a system.

32. The host of claim 17, further comprising means for recalculating entropy indicators for the second collection of data more frequently than the recalculation of entropy indicators for the first collection of data.

33. The host of claim 17, further comprising means for identifying a third collection of data to use the second amount of data from the third collection of data to calculate an initial entropy indicator for the whole third collection of data.

34. The DSD of claim 1, wherein the controller is further configured to recalculate entropy indicators for the second collection of data more frequently than the recalculation of entropy indicators for the first collection of data.

35. The host of claim 17, further comprising means for identifying the second collection based on at least one of a file type or object type, a name for the second collection of data, a size for the second collection of data, an owner for the second collection of data, a creation time for the second collection of data, and a last modification time for the second collection of data.

* * * * *